United States Patent [19]

Nozaki

[11] Patent Number: 4,894,953
[45] Date of Patent: Jan. 23, 1990

[54] DOOR GLASS RUN FOR MOTOR VEHICLE
[75] Inventor: Masahiro Nozaki, Ama, Japan
[73] Assignee: Toyoda Gosei Co., Ltd., Nishikasugai, Japan
[21] Appl. No.: 348,607
[22] Filed: May 8, 1989
[30] Foreign Application Priority Data May 9, 1988 [JP] Japan .............................. 63-60958[U]

[51] Int. Cl.$^4$ ............................................... E06B 7/16
[52] U.S. Cl. ......................................... 49/440; 49/479
[58] Field of Search .................. 49/440, 479, 493, 475
[56] References Cited

U.S. PATENT DOCUMENTS 2,040,306  5/1936  Hamm ..................................... 49/440
3,382,620  5/1968  Cloutier ................................. 49/440
4,625,458  12/1986 Okamoto ............................... 49/440

Primary Examiner—Kenneth J. Dorner
Assistant Examiner—Gerald A. Anderson
Attorney, Agent, or Firm—Cushman, Darby & Cushman

[57] ABSTRACT

A door glass run for a motor vehicle provided with a door mirror, has straight extruded door glass runs to be respectively mounted in an inclined front frame and a vertically extending frame supporting the door mirror bracket, and a molded door glass run in the form of a corner, which connects the straight extruded door glass runs to each other. A flange-shaped sealing wall is formed in an outer periphery of the molded door glass run for sealing a space between the molded door glass run and the opposed inclined front frame thereby preventing the occurance of wind noise due to the high speed blowing of air through the space during running of the motor vehicle.

5 Claims, 4 Drawing Sheets

DOOR GLASS RUN FOR MOTOR VEHICLE

BACKGROUND OF THE INVENTION

1. Field of the Invention

The present invention relates to a door glass run for a door of a motor vehicle, and more particularly to a door glass run for the door provided with a door mirror.

2. Description of the Prior Art

In a vehicle door provided with a door mirror, the door mirror is generally supported by a door mirror bracket 2 of a triangular shape, which is provided in a corner of a front lower portion of a door frame 11 as shown in FIG. 1.

A door glass run 3 is attached along an inner periphery of the door frame 11. In this case, as shown in FIGS. 1 and 2, especially FIG. 2, an upper end of a vertical frame 21 of the door mirror bracket 2 is welded to the door frame 11, and the door frame 11 and the vertical frame 21 forms a continuous channel in which the door glass run 3 is to be mounted.

The door glass run 3 is formed by connecting straight extruded door glass runs with a molded door glass run in the form of a corner.

FIG. 8 illustrates one portion of the continuous door glass run 3, which is to be attached along a corner portion wherein the door frame 11 is connected to the vertical frame 21. The reference numerals 3a and 3b designate extruded portions and 3c designates a molded portion.

As described above, the door glass run 3 is attached to the door frame 11 and the vertical frame 21 of the door mirror bracket 2. Between these frames 11, 21 and a bottom of the door glass run 3 is formed a space 5 as shown in FIG. 4. This space 5 serves to prevent the glass closing force from abruptly increasing at the time the door glass is closed up. Within the door mirror bracket 2 is formed a cavity opening below.

During running of the motor vehicle, air inevitably blows into the door 1 composed of an inner panel and an outer panel through a gap in a front end portion 120 (FIG. 1) of a belt line 12. Then, the air which have filled the cavity of the door mirror bracket 2 blows into the space 5 between the door frame 11 and the door glass run 3 and runs through the space 5 at high speed. At that time, undesirable wind noise occurs.

In order to prevent air from blowing into the space 5, a sponge sealing member is bonded to an outer periphery of the door glass run 3 to seal the space 5. However, this means necessitates to prepare the sponge sealing member and to bond it to the door glass run. Moreover, this sealing member is apt to peel off from the door glass run 3 so that this means is not effective.

SUMMARY OF THE INVENTION

It is an object of the present invention to provide a door glass run by which air can be surely prevented from blowing through a space between a door frame and a door glass run without bonding any sealing member to the door glass run.

According to the present invention, the door glass run is provided with straight extruded door glass runs and a molded door glass run in the form of a corner for connecting the straight extruded door glass runs to each other, which is to be attached to a connecting portion of an inclined front frame of a door frame and a vertical frame of a door mirror bracket. The door glass run is further provided with a sealing wall around the molded glass run integrally therewith for sealing a space between the molded glass run and the door frame, and longitudinally partitioning the space.

This sealing wall can prevent air from blowing into the space between the door frame and the door glass run thereby eliminating the generation of wind noise. Moreover, this sealing wall can be formed at the same time with the formation of the molded glass run without increase in number of producing steps.

BRIEF EXPLANATION OF THE DRAWINGS

FIG. 1 is a front view of a door of a motor vehicle;

FIG. 2 is a view illustrating a connecting portion of a door frame and a vertical frame of a door mirror bracket;

FIG. 3 is a perspective view of a corner portion of the door glass run to be attached to the connecting portion;

FIGS. 4 and 5 are cross sectional views respectively showing the attached states of the door glass run to the door frame at positions taken along the line IV—IV and V—V of FIG. 3;

FIG. 6 is a perspective view of a corner portion of the door glass run;

FIG. 7 is a cross sectional view showing the attached state of the door glass run to the door frame at a position taken along the line VII—VII of FIG. 6.

DETAILED DESCRIPTION OF THE EMBODIMENTS

Figure 1:
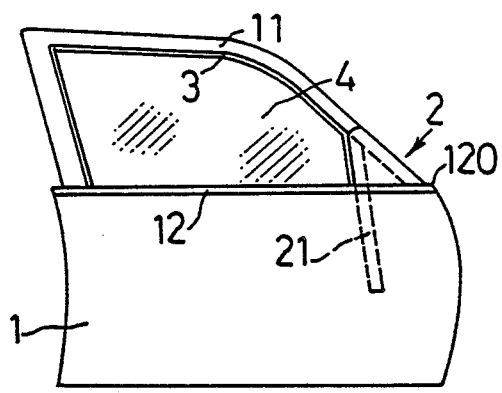
FIGS. 1 through 5 illustrate a first embodiment of a door glass run according to the present invention.
Figure 2:
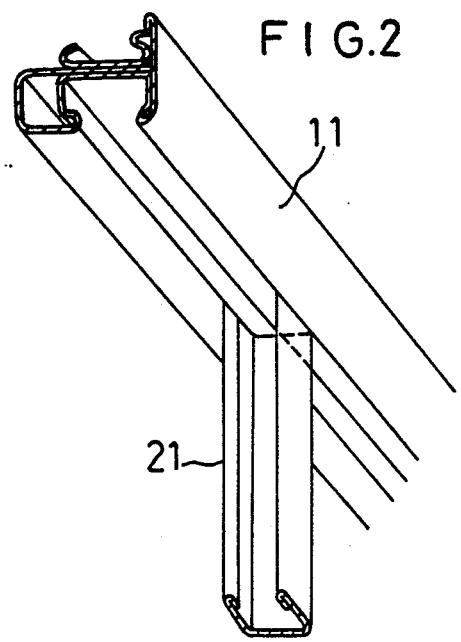

As shown in FIGS. 1 and 2, to a front inclined portion of a door frame 11 of a door 1 of a motor vehicle is welded an upper end of a vertical frame 21 of a door mirror bracket 2. The door mirror bracket 2 is installed in a triangular portion defined by the door frame 11, the vertical frame 21 and a door belt line 12. A main body of the door 1 is composed of an inner panel and an outer panel. The vertical frame 21 extends downward through a space between the inner panel and the outer panel of the door 1.

Figure 3:
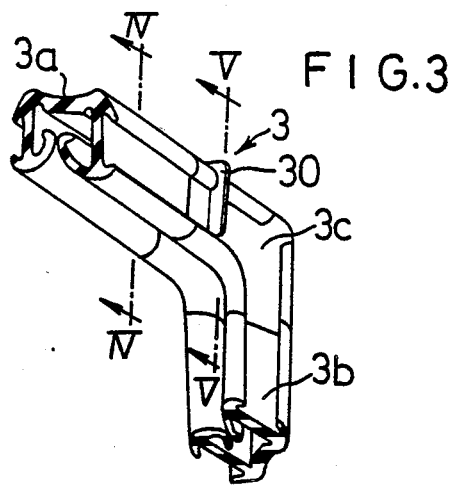
Figure 4:
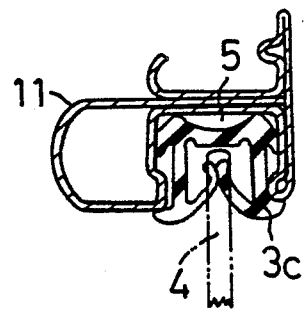
Figure 5:
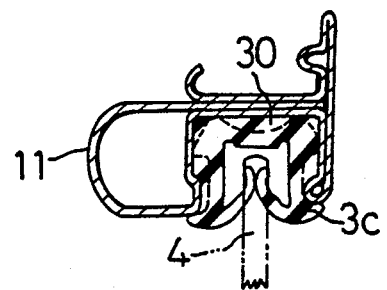

FIGS. 3 through 5 illustrate a first embodiment of a door glass run according to the present invention.

A door glass run 3 formed of an elastic material such as rubber is continuously mounted in a channel formed in the door frame 11 and the vertical frame 21. The door glass run 3 is composed of extruded straight portions and a molded portion for connecting the extruded straight portions in the form of a corner.

FIG. 3 illustrates a corner portion of the door glass run 3 to be attached in a connecting portion of the door frame 11 and the vertical frame 21 shown in FIG. 2. In the corner portion, an extruded portion 3a to be attached in the door frame 11, and an extruded portion 3b to be attached in the vertical frame 21 are connected by a molded portion 3c. In the whole of the outer periphery of the molded portion 3c is formed a flange-shaped sealing wall 30 at a position near the extruded portion 3a in a circumferential direction. The molded portion 3c provided with the sealing wall 30 is formed by putting ends of the respective extruded portions 3a and 3b within a cavity of a metal mold in opposed relationship, pouring a rubber material into the cavity, and molding the rubber material. The sealing wall 30 is also molded at this time.

The thus formed continuous door glass run 3 provided with a molded corner portion is attached to the door frame 11 and the vertical frame 21. FIG. 4 is a cross sectional view illustrating the attached state of the door glass run 3 to the door frame 11 at the position along the line IV—IV of FIG. 3, and FIG. 5 is a cross sectional view illustrating the attached state of the door glass run 3 to the door frame 11 at the position along the line V—V of FIG. 3, wherein the sealing wall 30 is formed.

According to the above-described first embodiment, the sealing wall 30 is in close contact with an inner peripheral surface of the door frame 11 to partition all spaces around the door glass run 3 including the space 5. Therefore, during running of the motor vehicle, air is prevented from blowing into the space 5 upward by virtue of the sealing wall 30 thereby preventing air from blowing through the gap 5 along the door frame 11 and accordingly preventing the generation of wind noise. Moreover, since the sealing wall 30 is molded with the formation of the molded portion 3c, the number of producing steps is not increased.

Figure 6:
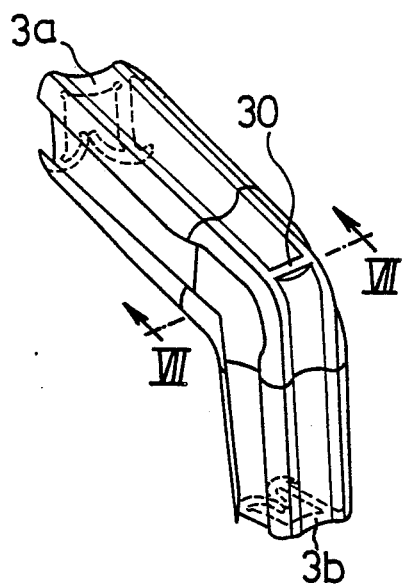
FIGS. 6 and 7 illustrate a second embodiment of the door glass run according to the present invention.
Figure 7:
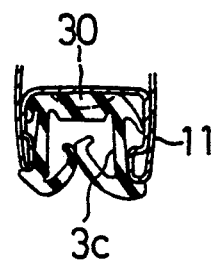
Figure 8:
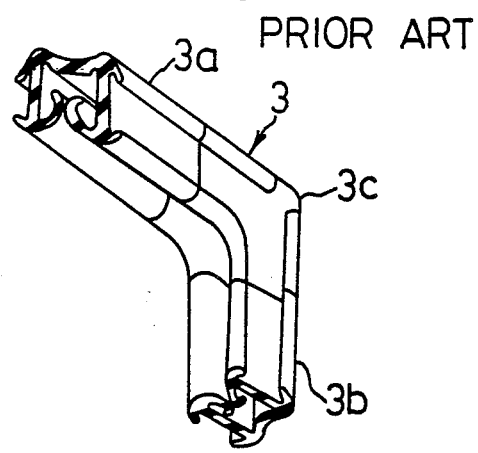
FIG. 8 is a view illustrating the corner portion of the conventional door glass run.

FIGS. 6 and 7 illustrate a second embodiment of a door glass run according to the present invention. In the second embodiment, the sealing wall 30 is formed only in an outer surface of a bottom of the molded portion 3c. The other construction of the second embodiment is substantially equal to that of the first embodiment.

Air blowing into the door mirror bracket blows mainly through the space between the outer surface of the bottom of the door glass run 3 and the opposite inner surface of the door frame 11. At this time, air scarcely blows into the spaces on both sides of the door glass run. Therefore, according to the second embodiment, the generation of wind noise due to the blowing through of air can be prevented.

The present invention is not limited to the door glass run of such a type as shown in the preceding embodiments, and can be widely applied to a molded portion of a door glass run wherein spaces exist between the outer periphery of the door glass run and the opposite inner periphery of the door frame.

What is claimed is:

1. A door glass run made of an elastic material, which is to be attached to a door frame of a door of a motor vehicle, provided with a door mirror bracket, the door frame being composed of an inclined front frame portion, and a vertically extending frame portion for supporting the door mirror bracket, an upper end of the vertically extending frame portion being connected with the inclined front frame portion, comprising:
    a straight extruded door glass run to be mounted in the inclined front frame portion;
    another straight extruded door glass run to be mounted in the vertically extending frame portion; and
    a molded door glass run in the form of a corner for connecting said straight extruded door glass run and said another straight extruded door glass run;
    said molded door glass run being provided with a flange-shaped sealing wall in its outer periphery for sealing a space between said molded door glass run and the opposite door frame.

2. A door glass run according to claim 1, wherein said sealing wall is integrally molded with said molded door glass run.

3. A door glass run according to claim 2, wherein the door frame is provided with a continuous channel of a U-shaped cross section, said extruded door glass run, said another extruded door glass run, and said molded door glass run respectively have a U-shaped cross section to be mounted in the continuous channel of the door frame.

4. A door glass run according to claim 3, wherein said sealing wall is formed in the whole outer peripheral surface of said molded door glass run in its circumferential direction.

5. A door glass run according to claim 3, wherein said sealing wall is formed in an outer surface of a bottom of said molded door glass run.

* * * * *